(12) United States Patent  
Ono (10) Patent No.: US 10,434,955 B2  
(45) Date of Patent: Oct. 8, 2019

(54) LUGGAGE COMPARTMENT STRUCTURE OF VEHICLE

(71) Applicant: TOYOTA BOSHOKU KABUSHIKI KAISHA, Aichi-ken (JP)

(72) Inventor: Teruki Ono, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 126 days.

(21) Appl. No.: 15/800,798

(22) Filed: Nov. 1, 2017

(65) Prior Publication Data

US 2018/0127031 A1 May 10, 2018

(30) Foreign Application Priority Data

Nov. 9, 2016 (JP) .................................. 2016-218720

(51) Int. Cl.
*B60R 13/01* (2006.01)
*B62D 25/08* (2006.01)
(Continued)

(52) U.S. Cl.
CPC .............. *B60R 13/013* (2013.01); *B60R 5/04* (2013.01); *B60R 11/06* (2013.01); *B60R 13/011* (2013.01);
(Continued)

(58) Field of Classification Search
CPC .......... B60R 5/04; B60R 5/044; B60R 11/06; B60R 13/011; B60R 13/013; B62D 25/087; B62D 25/2081; B62D 43/10
(Continued)

(56) References Cited

U.S. PATENT DOCUMENTS 6,505,874 B2    1/2003   Ando et al.
8,678,462 B2 *  3/2014   Simon ...................... B60R 7/02
                                                      296/24.33
(Continued)

FOREIGN PATENT DOCUMENTS

JP        2001-260756        9/2001

OTHER PUBLICATIONS

NPL document, 2013 Audi A4 Rear Trunk Liner Handle; located at https://parts.audiusa.com/p/Audi_/Handle-Cover/48593532/8E5863627.html with more figures from www.amazon.com. (Year: 2019).*

*Primary Examiner* — Jason S Daniels
(74) *Attorney, Agent, or Firm* — Greenblum & Bernstein, P.L.C.

(57) ABSTRACT

A luggage compartment structure of a vehicle includes a luggage compartment floor component and a luggage compartment mat assembly. The luggage compartment floor component includes a handle retaining recess. The luggage compartment mat assembly is disposed on the luggage compartment floor component. The luggage compartment mat assembly includes a luggage compartment mat and a recessed handle that is for lifting the luggage compartment mat. The luggage compartment mat includes a mounting hole. The recessed handle includes a flat portion and a recessed portion. The flat portion includes at least one edge disposed on a top surface of the luggage compartment mat. The recessed portion is recessed downward relative to the flat portion and disposed in the mounting hole of the luggage compartment mat to project from a back surface of the luggage compartment mat. The recessed portion is retained in the handle retaining recess of the luggage compartment floor component.

11 Claims, 5 Drawing Sheets

(51) Int. Cl.
*B60R 11/06* (2006.01)
*B60R 5/04* (2006.01)
*B62D 25/20* (2006.01)

(52) U.S. Cl.
CPC ....... *B62D 25/087* (2013.01); *B62D 25/2081* (2013.01)

(58) Field of Classification Search
USPC .............................. 296/37.14, 37.16, 97.23
See application file for complete search history.

(56) References Cited

U.S. PATENT DOCUMENTS

| | | | |
|---|---|---|---|
| 10,059,281 B2* | 8/2018 | Kong | B60R 13/013 |
| 2010/0078956 A1* | 4/2010 | Aebker | B60R 5/04 |
| | | | 296/37.13 |
| 2014/0070560 A1* | 3/2014 | Young | B60R 5/04 |
| | | | 296/37.14 |

* cited by examiner

LUGGAGE COMPARTMENT STRUCTURE OF VEHICLE

CROSS REFERENCE TO RELATED APPLICATION

This application claims priority from Japanese Patent Application No. 2016-218720 filed on Nov. 9, 2016. The entire contents of the priority application are incorporated herein by reference.

TECHNICAL FIELD

The present disclosure relates to a luggage compartment structure of a vehicle.

BACKGROUND

A luggage compartment structure of a vehicle includes a floor component and a luggage compartment mat placed over the floor component to form a floor surface of the luggage compartment so that packages and miscellaneous things can be placed on the floor surface. To increase a storage area of the luggage compartment, not only an area behind back seats but also areas behind the wheel housings are included in the storage area. Therefore, a shape of the floor surface of the storage area in a plan view is complicated and the shape differs from vehicle to vehicle. A conventional luggage compartment mat has a shape along an outline of the floor surface; however, a rectangular luggage compartment mat that does not have a shape along the outline of the shape of the floor surface is becoming popular. With the rectangular luggage compartment mat including linear side edges that extends in the front-rear direction of the vehicle, versatility and quality in the appearance of the interior of the luggage compartment improve.

In the luggage compartment, side trims are installed. The side trims include extending portions that extend from lower edges of sidewall portion of the side trims, respectively. Top surfaces of the extending portions of the side trims form sections of the floor surface behind the wheel housing. The rectangular luggage compartment mat is installed in the luggage compartment such that a rear portion of the luggage compartment mat is disposed between the extending portions of the side trims. If the rectangular luggage compartment mat assembly moves in the width direction of the vehicle, the side edge of the rectangular luggage compartment mat may be placed over the extending portion of the side trim. This may reduce the quality in the appearance of the interior of the luggage compartment and usability.

To restrict the displacement of the luggage compartment mat assembly, protrusions may be provided at boundaries between the luggage compartment mat and the extending portions of the side trims. However, such protrusions may become obstacles to loading and unloading the luggage compartment or reduce the quality in the appearance of the interior of the luggage compartment. There is an increase in demand for a luggage compartment structure that can maintain the luggage compartment mat in place without reducing the usability and the quality in the appearance of the interior of the luggage compartment.

SUMMARY

The present invention was made in view of the foregoing circumstances. An object is to provide a luggage compartment structure that properly restricts displacement of a luggage compartment mat.

A luggage compartment structure of a vehicle includes a luggage compartment floor component and a luggage compartment mat assembly. The luggage compartment floor component includes a handle retaining recess. The luggage compartment mat assembly includes a luggage compartment mat including a mounting hole and a recessed handle for lifting the luggage compartment mat. The recessed handle includes a flat portion and a recessed portion. The flat portion includes at least one edge disposed on a top surface of the luggage compartment mat. The recessed portion is recessed downward relative to the flat portion and disposed in the mounting hole of the luggage compartment mat to project from a back surface of the luggage compartment mat. The recessed portion is retained in the handle retaining recess of the luggage compartment floor component.

Because a handle for lifting the luggage compartment mat is the recessed handle, the handle does not protrude from the top surface of the luggage compartment mat. Therefore, the handle is less likely to become obstacles to loading and unloading the luggage compartment or reduce the quality in the appearance of the interior of the luggage compartment. Furthermore, because the recessed portion is retained in the handle retaining recess of the luggage compartment floor component, the luggage compartment mat is less likely to be displaced.

According to the technologies described herein, a luggage compartment structure that properly restricts displacement of a luggage compartment mat is provided.

DETAILED DESCRIPTION

Figure 1:
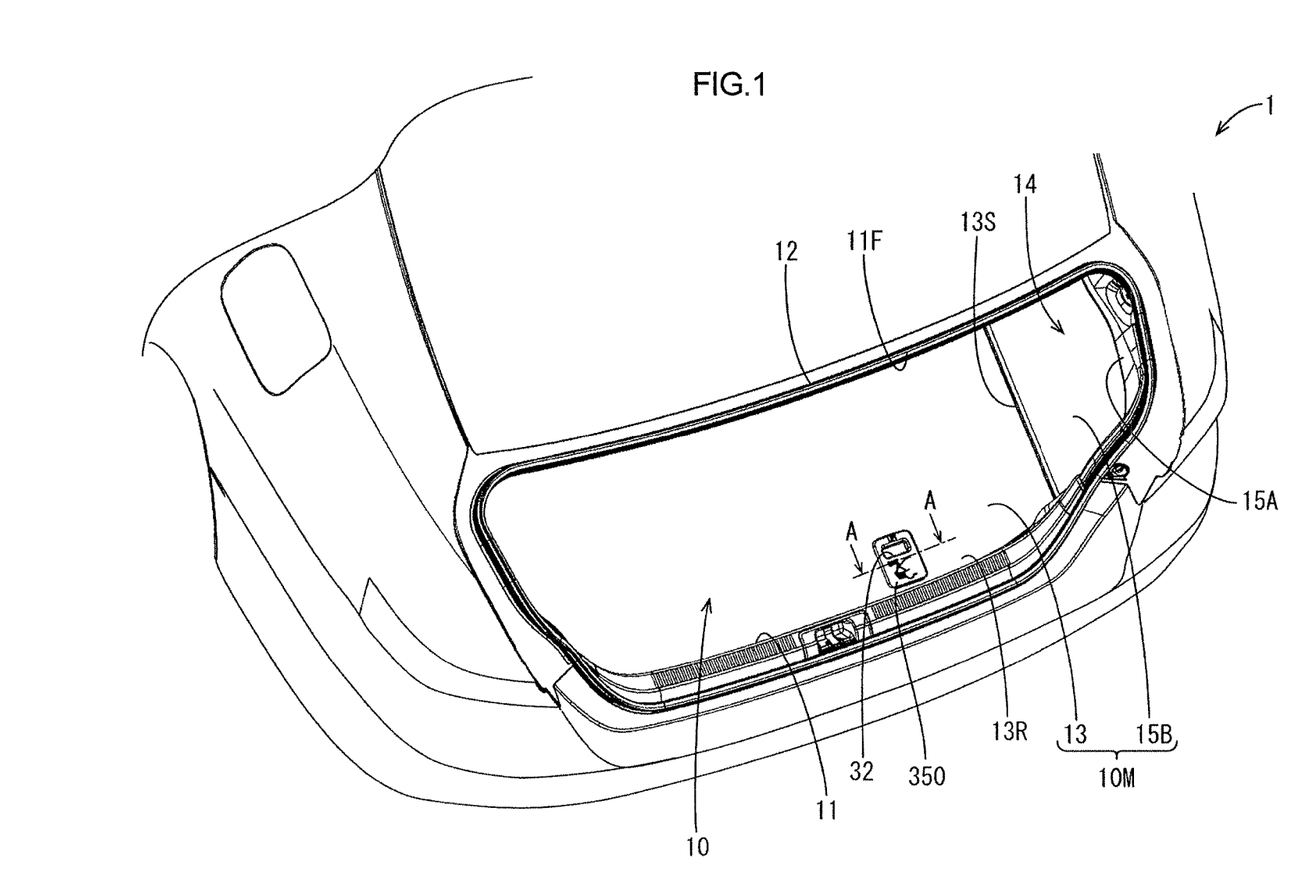
FIG. 1 is a perspective view of a rear portion of a vehicle including a luggage compartment structure and a luggage compartment mat assembly.

An embodiment will be described with reference to FIGS. 1 to 5. Specifically, a luggage compartment structure of a vehicle will be described. In FIGS. 1 to 3 and 5, the diagonal direction from the upper left to the lower right corresponds to the front-rear direction of the vehicle. As illustrated in FIG. 1, the vehicle includes a luggage compartment 10 at the rear of the vehicle. The vehicle includes a rear opening 11 that is covered with a rear door and the luggage compartment 10 is accessible through the rear opening 11 with the rear door opened. The rear opening 11 includes an opening edge 11F. An opening trim 12 that is a sealing member for protecting the luggage compartment 10 from rain, wind, and noises is attached to the opening edge 11F all the way around.

The vehicle includes luggage compartment side trims 14 that form sidewalls of the luggage compartment 10. The luggage compartment side trims 14 include sidewalls 15A and extending portions 15B. Each of the extending portions 15B horizontally extends inward from the bottom edge of the corresponding sidewall 15A. The sidewall 15A of each luggage compartment side trim 14 is curved such that side edges of the sidewall 15A are located inner than an apex of the curve. The extending portions 15B include linear edges at distal ends thereof which extend in the front-rear direction of the vehicle.

Figure 2:
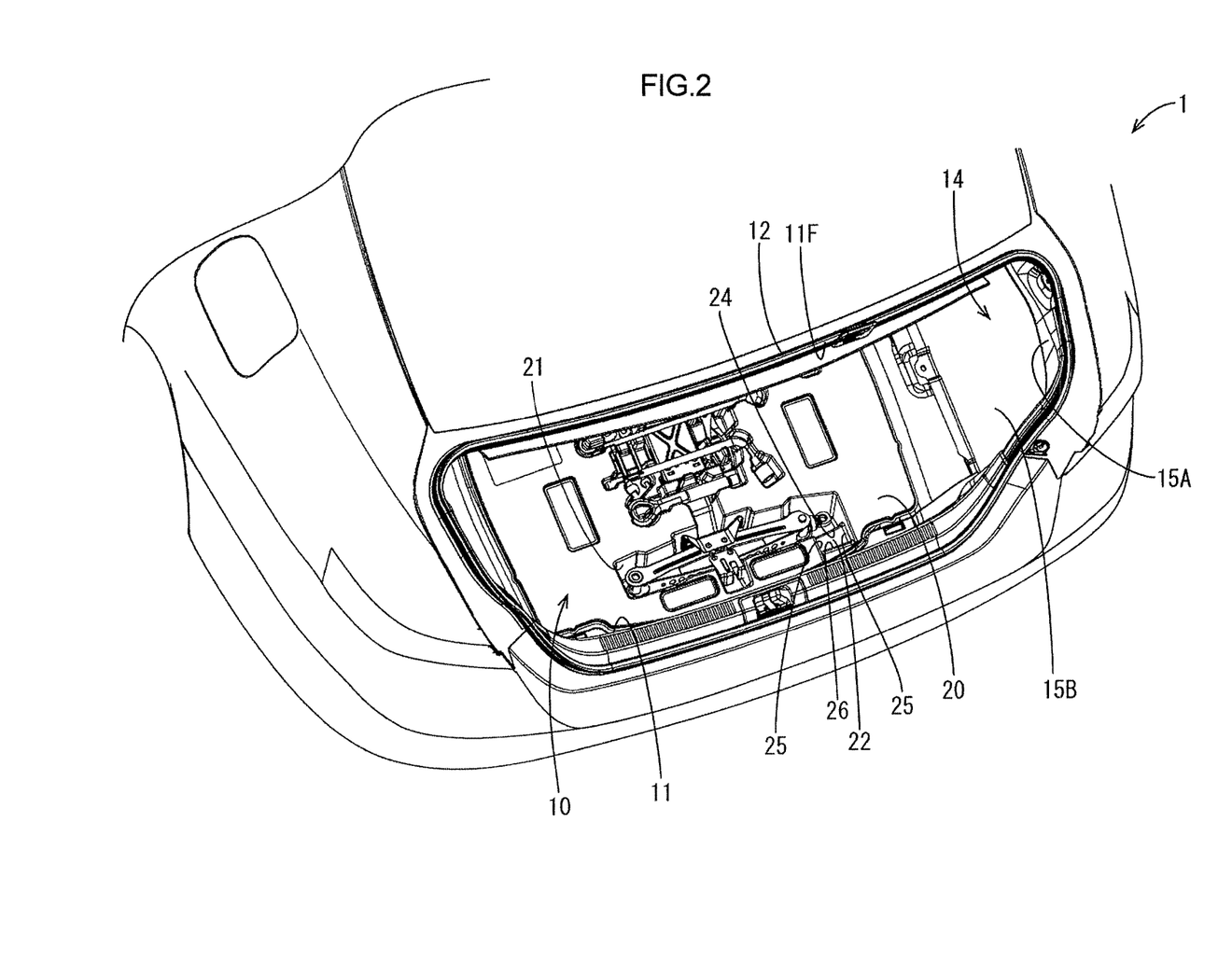
FIG. 2 is a perspective view of the rear portion of the vehicle without the luggage compartment mat assembly.
Figure 3:
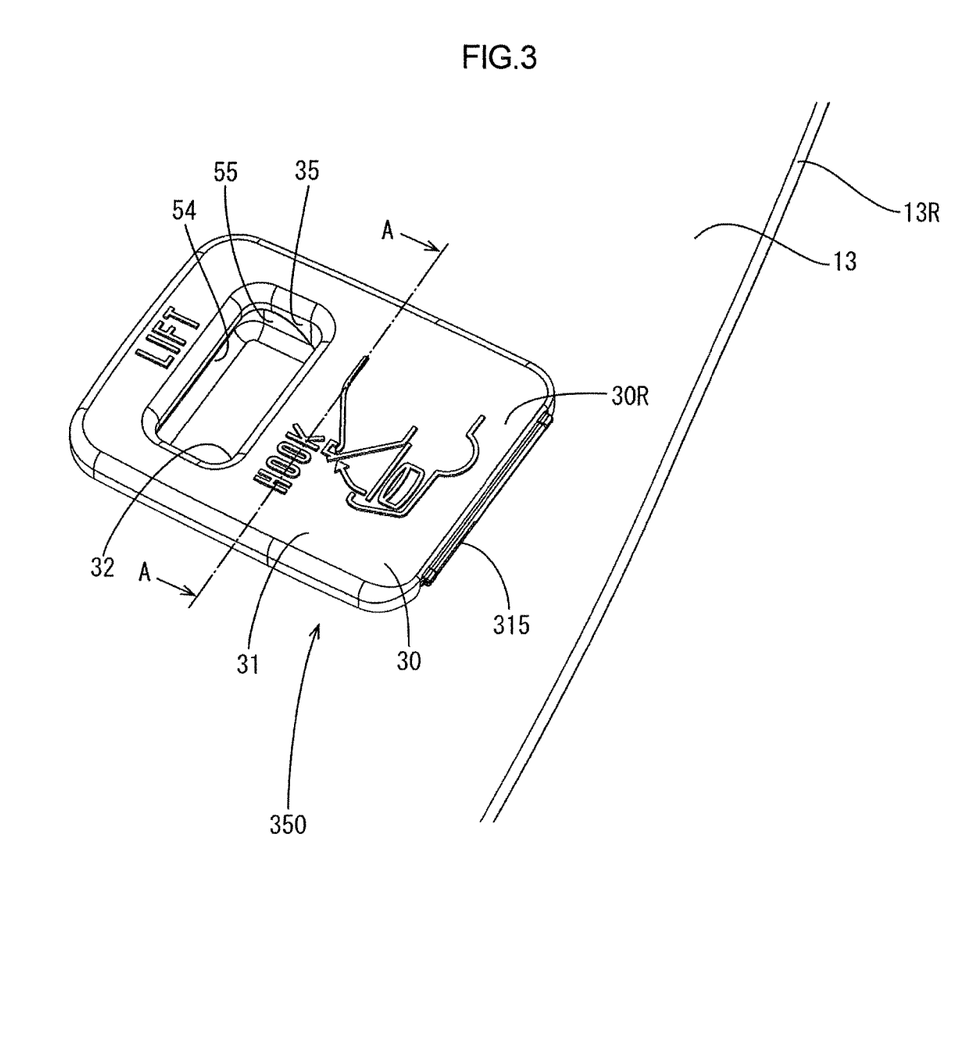
FIG. 3 is a magnified view of a portion of the luggage compartment mat assembly including a recessed handle.

As illustrated in FIG. 2, an under floor storage tray 20 (a luggage compartment floor component) is disposed between the extending portions 15B such that a top surface of the under floor storage tray 20 is below back surfaces of the extending portions 15B. The under floor storage tray 20 includes a recess 21 for holding tools including a jack.

A luggage compartment mat assembly 1 is placed on the under floor storage tray 20 in the luggage compartment 10. The luggage compartment mat assembly 1 includes a luggage compartment mat 13 and a recessed handle 350. The luggage compartment mat 13 having a plate shape including linear side edges 13S is disposed in a horizontal position on the under floor storage tray 20 in the luggage compartment 10. The luggage compartment mat 13 is orientated such that the linear side edges 13S are aligned with the linear edges of the extending portions 15B to extend in the front-rear direction of the vehicle. A top surface of the luggage compartment mat 13 is flush with top surfaces of the extending portions 15B. The top surface of the luggage compartment mat 13 and the top surfaces of the extending portions 15B form a floor surface 10M of the luggage compartment 10. The floor surface 10M is a receiving surface on which things can be placed.

Figure 4:
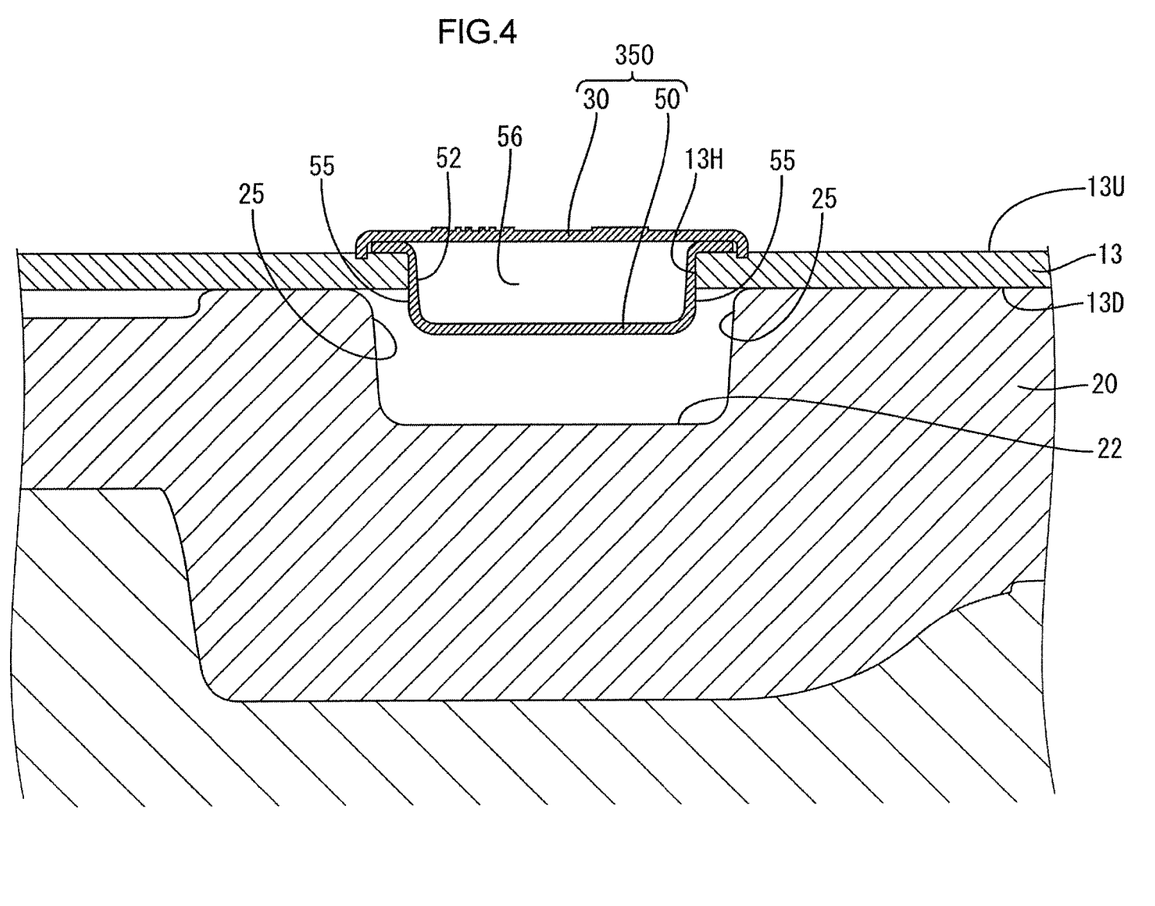
FIG. 4 is a cross-sectional view along line A-A in FIGS. 1 and 3.
Figure 5:
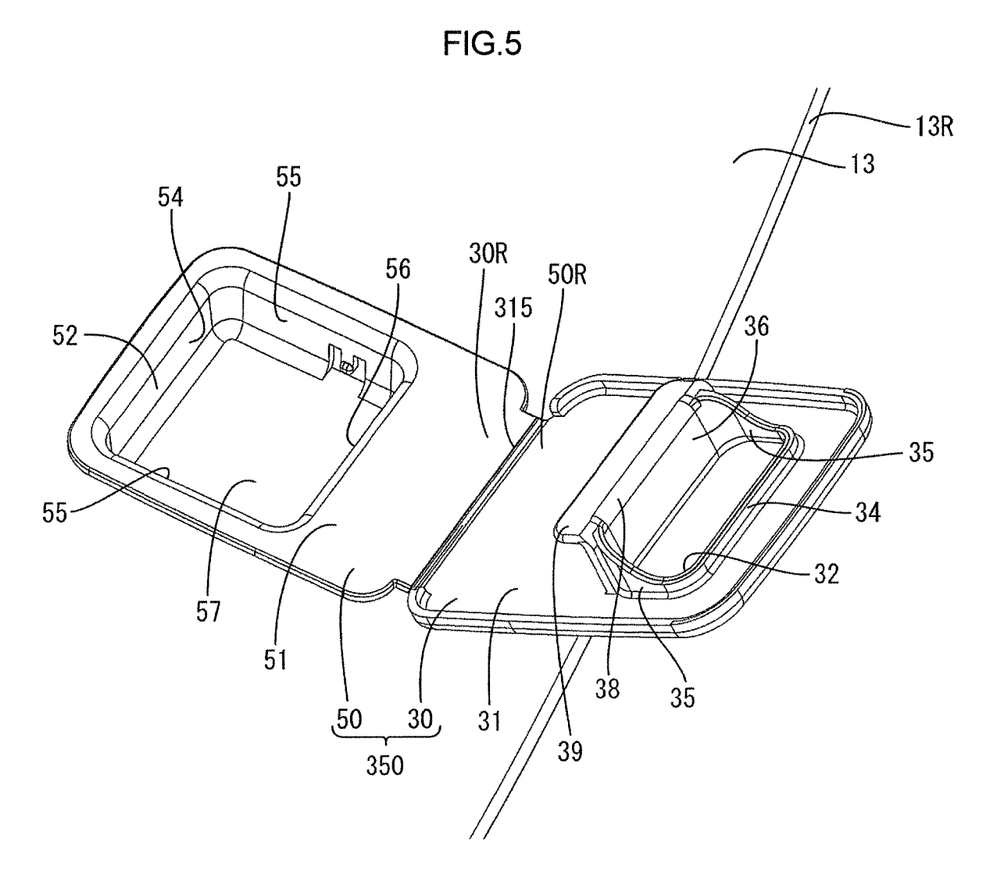
FIG. 5 is a perspective view of the recessed handle with a cover opened.

The recessed handle 350 is for lifting the luggage compartment mat 13 with fingers. As illustrated in FIGS. 4 and 5, the recessed handle 350 includes an upper component 30 and a lower component 50. The upper component 30 and the lower component 50 include rear end portions 30R and 50R, respectively. The rear end portions 30R and 50R are coupled together with hinges 315. Namely, the upper component 30 is coupled to the lower component such that the upper component 30 is switchable between a covering position to cover the lower component 50 and an uncovering position to uncover the lower component 50.

The lower component 50 includes a flat portion 51 and a recessed portion 52. The recessed portion 52 is formed in a section of the flat portion 51 closer to the front edge of the lower component 50 closer to the front of the vehicle. The recessed portion 52 is recessed downward relative to the flat portion 51 with an opening on the upper side and thus protruding downward from the back surface of the flat portion 51. The recessed portion 52 includes a front wall 54 closer to the front of the vehicle, a rear wall 56 closer to the rear of the vehicle, two sidewalls 55 connecting the front wall 54 to the rear wall 56, and a bottom wall 57. The bottom wall 57 has a rectangular shape. The front wall 54 extends from a front opening edge of the recessed portion 52 closer to the front of the vehicle to the front edge of the bottom wall 57 closer to the front of the vehicle. The rear wall 56 extends from a rear opening edge of the recessed portion 52 closer to the rear of the vehicle to the rear edge of the bottom wall 57 closer to the rear of the vehicle. The sidewalls 55 extend from the side opening edges of the recessed portion 52 between the front opening edge and the rear opening edge to side edges of the bottom wall 57, respectively.

The luggage compartment mat 13 includes a mounting hole 13H that is a through hole having a shape along an outline of the recessed portion 52. The recessed portion 52 is inserted in the mounting hole 13H of the luggage compartment mat 13. A section of the flat portion 51 around the recessed portion 52 is disposed on an edge portion of the luggage compartment mat 13 around the mounting hole 13H. The recessed portion 52 has a height larger than a thickness of the luggage compartment mat 13 and thus projects downward from a back surface 13D of the luggage compartment mat 13 that is disposed over the under floor storage tray 20 (see FIG. 4).

The upper component 30 has a plate shape. The upper component 30 is placed over the lower component 50 to cover the lower component 50, that is, the upper component 30 is in the covering position when the luggage compartment mat assembly 1 is placed over the under floor storage tray 20. The upper component 30 can open on hinges 315 to hold the luggage compartment mat 13 open after the luggage compartment mat 13 is lifted to open, that is, the upper component 30 is in the uncovering position. The upper component 30 includes a flat portion 31 and a through hole 32 having a rectangular shape with round corners. The through hole 32 is formed in a section of the flat portion 31 closer to the front edge of the upper component 30 that is in the covering position closer to the front of the vehicle and corresponding to the recessed portion 52 of the lower component 50. Namely, the upper component 30 is coupled to the lower component 50 to cover the lower component 50 with the through hole 32 over the recessed portion 52. The luggage compartment mat 13 can be lifted with fingers hooked around an edge of the through hole 32.

The upper component 30 includes a front hole edge portion 34, a rear hole edge portion 36, and side hole edge portions 35 that define the through hole 32. When the upper component 30 is in the covering position, the front hole edge portion 34 and the rear hole edge portion 36 are located closer to the front of the vehicle and closer to the rear of the vehicle, respectively, and extend downward from the front edge and the rear edge of the through hole 32, respectively. Furthermore, the side hole edge portions 35 are located closer to the respective side edges of the upper component 30 and extend downward from the respective side edges of the through hole 32 of the upper component 30 in the covering position, respectively. The height of the front hole edge portion 34 is constant and smaller than the height of the front wall 54 of the lower component 50. The height of the rear hole edge portion 36 is constant and about equal to the height of the rear wall 56 of the lower component 50. The height of the side hole edge portions 35 gradually increases from the front hole edge portion 34 toward the rear hole edge portion 36 to continue from the front hole edge portion 34 to the rear hole edge portion 36.

The upper component 30 further includes a flange portion 39 that horizontally extends from the rear edge 38 of the rear hole edge portion 36 toward the rear of the vehicle when the upper component 30 is in the covering position. The flange portion 39 is hidden when the upper component 30 is closed. When the luggage compartment mat 13 is lifted to open, the upper component 30 may be opened on the hinges 315 until the flange portion 39 appears. The flange portion 39 can be hooked to an upper section of the opening trim 12 to hold the luggage compartment mat 13 open.

As illustrated in FIG. 4, when the upper component 30 is in the covering position, the top surface of the upper component 30 of the recessed handle 350 is only slightly above an top surface 13U of the luggage compartment mat 13. Therefore, an overall top surface of the luggage compartment mat assembly 1 formed by the top surface of the upper component 30 and the top surface 13U of the luggage compartment mat 13 is substantially smooth. Because the recessed portion 52 of the lower component 50 is disposed below the back surface 13D of the luggage compartment mat 13, the largest height of the recessed handle 350 is larger than the thickness of the luggage compartment mat 13.

As illustrated in FIGS. 2 and 4, the under floor storage tray 20 includes a handle retaining recess 22 for retaining a portion of the recessed portion 52 of the lower component 50 projecting from the back surface 13D of the luggage compartment mat 13. The handle retaining recess 22 is formed in a portion of the under floor storage tray 20 opposed to the recessed handle 350 of the luggage compartment mat assembly 1 that is placed on the under floor storage tray 20. The handle retaining recess 22 includes a front wall 24, a rear wall 26, sidewalls 25, and a bottom wall, that is, the handle retaining recess 22 opens toward the upper side. As illustrated in FIG. 4, when the recessed portion 52 of the lower component 50 is retained in the handle retaining recess 22, the sidewalls 55 of the lower component 50 are opposed to the sidewalls 25 of the handle retaining recess 22 with clearances in a range of some millimeters, respectively.

According to the configuration, even if the luggage compartment mat 13 is displaced from its original position, an amount of the displacement is within a clearance between the walls of the recessed portion 52 and the walls of the handle retaining recess 22. Further displacement is restricted through a catch of the recessed portion 52 of the lower component 50 of the recessed handle 350 by the handle retaining recess 22 of the under floor storage tray 20. Specifically, the sidewall 55 of the recessed portion 52 of the lower component 50 contact the sidewall 25 of the handle retaining recess 22 of the under floor storage tray 20 before the side edge of the luggage compartment mat 13 is placed over the extending portion 15B of the luggage compartment side trim 14. Namely, the displacement of the luggage compartment mat assembly 1 is restricted so that the side edge of the luggage compartment mat 13 is not placed over the extending portion 15B of the luggage compartment side trim 14.

A user can insert his or her fingers into the recessed portion 52 through the through hole 32 and hook the fingers around the edge of the through hole 32 to open or close the luggage compartment mat 13. Namely, a portion of the recessed handle 350 used for opening and closing the luggage compartment mat 13 does not protrude from the top surface 13U of the luggage compartment mat 13. The luggage compartment mat assembly 1 has a substantially flat top surface. Furthermore, because the recessed portion 52 that protrudes under the back surface of the luggage compartment mat 13 is regained in the handle retaining recess 22, the replacement of the luggage compartment mat assembly 1 more than the clearance between the walls of the recessed portion 52 and the walls of the handle retaining recess 22 is restricted.

If the luggage compartment mat assembly 1 moves in the width direction of the vehicle, the sidewall 55 of the recessed portion 52 of the recessed handle 350 contact the sidewall of the handle retaining recess 22 and the displacement of the luggage compartment mat assembly 1 in the width direction of the vehicle is restricted. Because the recessed portion 52 and the handle retaining recess 22 are disposed under the luggage compartment mat 13, the recessed portion 52 and the handle retaining recess 22, that is, a mechanism for restricting the displacement of the luggage compartment mat assembly 1 does not affect the capacity of the luggage compartment 10. Furthermore, through the catch of the recessed portion 52 by the handle retaining recess 22, the displacement of the luggage compartment mat assembly 1 is restricted regardless of deformation or errors in outline of the luggage compartment mat 13. The displacement of the luggage compartment mat assembly 1 is limited within a range of some millimeters with the mechanism that is small in size.

It is easy to form the handle retaining recess 22 in the under floor storage tray 20, which is a common component installed under a floor of a luggage compartment. With the recessed portion 52 and the handle retaining recess 22, special components are not required for restricting the displacement of the luggage compartment mat assembly 1. This configuration has a cost advantage. The handle retaining recess 22 can be formed at a position such that the tool can be easily taken out of the tray 20.

In comparison to a recessed handle that does not have a two-story configuration, the recessed handle 350 in this embodiment has a larger height, that is, a dimension in the vertical direction of the vehicle. To maintain the capacity of the luggage compartment above the luggage compartment mat assembly 1 without an influence of the recessed handle 350 that is in the covering position, it is preferable to dispose the recessed handle 350 such that a height of the recessed handle 350 above the top surface 13U of the luggage compartment mat 13 as small as possible. Namely, it is preferable to dispose the recessed portion 52 of the lower component 50 in the mounting hole 13H of the luggage compartment mat 13 such that the height of the recessed handle 350 above the top surface 13U of the luggage compartment mat 13 is as small as possible. As a height of the recessed portion 52 under the back surface 13D of the luggage compartment mat 13 increases, portions of the sidewalls 55 under the back surface 13D of the luggage compartment mat 13 increase. Namely, areas of the sidewalls 55 opposed to the sidewalls 25 of the handle retaining recess 22 increase. According to the configuration, the recessed portion 52 is properly retained in the handle retaining recess 22. Furthermore, an area of each of the sidewalls 55 which contact the corresponding sidewall 25 of the handle retaining recess 22 when the luggage compartment mat assembly 1 moves in the width direction of the vehicle increases. Therefore, the further displacement of the luggage compartment mat assembly 1 is further properly restricted.

Other Embodiments

The technology described herein is not limited to the embodiment described in the above description and the drawings. The technology described herein may include the following embodiments. Furthermore, the configuration of the above embodiment may be altered within the scope of the present invention.

(1) A rear floor finish plate including a handle retaining recess for retaining a recessed portion of a recessed handle of a luggage compartment mat assembly may be included in the technical scope of the present invention.

(2) Other types of recessed handles including a recessed handle configured to held with fingers and a palm may be included in the technical scope of the present invention.

The invention claimed is:
1. A luggage compartment structure of a vehicle comprising:
 a luggage compartment floor component including a handle retaining recess; and
 a luggage compartment mat assembly disposed on the luggage compartment floor component, the luggage compartment mat assembly including:
 a luggage compartment mat including a mounting hole; and a recessed handle for lifting the luggage compartment mat, the recessed handle including:
  a flat portion including at least one edge disposed on a top surface of the luggage compartment mat; and
  a recessed portion recessed downward relative to the flat portion and disposed in the mounting hole of the luggage compartment mat to project from a back surface of the luggage compartment mat, the recessed portion being retained in the handle retaining recess of the luggage compartment floor component, wherein
the recessed portion includes a sidewall opposed to a sidewall of the handle retaining recess, and
when a force acts on the luggage compartment mat assembly in the width direction, the sidewall of the recessed portion contacts the sidewall of the handle retaining recess to restrict displacement of the luggage compartment mat assembly relative to the luggage compartment floor component.

2. The luggage compartment structure according to claim 1, wherein
the flat portion of the recessed handle is disposed such that a top surface of the flat portion and the top surface of the luggage compartment mat form a smooth surface of the luggage compartment mat assembly,
the recessed portion has a height larger than a thickness of the luggage compartment mat, and
the handle retaining recess has an opening on an upper side.

3. The luggage compartment structure according to claim 1, wherein the luggage compartment floor component is an under floor storage tray for storing tools.

4. The luggage compartment structure according to claim 1, wherein
the recessed portion includes a bottom wall, a front wall, a rear wall, and the sidewall, wherein the sidewall is two sidewalls,
the bottom wall has a rectangular shape,
the front wall extends from a front opening edge of the recessed portion closer to a front of the vehicle to a front edge of the bottom wall closer to the front of the vehicle,
the rear wall extends from a rear opening edge of the recessed portion closer to a rear of the vehicle to a rear edge of the bottom wall closer to the rear of the vehicle,
the sidewalls extend from side opening edges of the recessed portion between the front opening edge and the rear opening edge to side edges of the bottom wall, respectively,
the sidewall of the handle retaining recess includes at least two sidewalls opposed to the two sidewalls of the recessed portion, and
a clearance is provided between the respective opposed sidewalls when the recessed portion is recessed downward relative to the flat portion and disposed in the handle retaining recess.

5. The luggage compartment structure according to claim 1, wherein
the recessed handle includes an upper component and a lower component,
the upper component has a plate shape to cover the lower component,
the upper component is coupled to the lower component such that the upper component is switchable between a covering position to cover the lower component and an uncovering position to uncover the lower component,
the lower component includes the flat portion and the recessed portion, and
the sidewall of the recessed portion extends downward from an opening edge of the recessed portion to be opposed to the sidewall of the handle retaining recess.

6. The luggage compartment structure according to claim 5, wherein
the upper component and the lower component are coupled with hinges,
the upper component includes:
hole edge portion that extends from a back surface of the upper component toward the bottom wall of the recessed portion with the upper component in the covering position; and
a that extends from a distal end of the hole edge portion in a direction substantially perpendicular to a direction in which the hole edge portion extends, and
the hole edge portion and the flange are retained in the recessed portion with the upper component in the covering position.

7. The luggage compartment structure according to claim 1, wherein
the recessed handle includes an upper component and a lower component,
the upper component has a plate shape to cover the lower component,
the upper component is coupled to the lower component such that the upper component is switchable between a covering position to cover the lower component and an uncovering position to uncover the lower component,
the lower component includes the flat portion and the recessed portion,
the recessed portion includes a bottom wall, a front wall, a rear wall, and the sidewall, wherein the sidewall is two sidewalls,
the bottom wall has a rectangular shape,
the front wall extends from a front opening edge of the recessed portion closer to a front of the vehicle to a front edge of the bottom wall closer to the front of the vehicle,
the rear wall extends from a rear opening edge of the recessed portion closer to a rear of the vehicle to a rear edge of the bottom wall closer to the rear of the vehicle,
the two sidewalls extend from side opening edges of the recessed portion between the front opening edge and the rear opening edge to side edges of the bottom wall, respectively,
the sidewall of the handle retaining recess includes at least two sidewalls opposed to the two sidewalls of the recessed portion, and
a clearance is provided between the respective opposed sidewalls when the recessed portion is recessed downward relative to the flat portion and disposed in the handle retaining recess.

8. The luggage compartment structure according to claim 7, wherein
the upper component includes a through hole that is smaller than the opening of the recessed portion of the lower component, and
the upper component is disposed over the lower component such that the through hole is over the recessed portion.

9. The luggage compartment structure according to claim 1 further comprising a side trim including a sidewall and an extending portion extending from a lower edge of the sidewall toward an interior of the luggage compartment and including a linear edge at a distal end, wherein the luggage compartment mat includes a linear side edge aligned with and the linear edge of the extending portion of the side trim, and the luggage compartment mat is disposed such that the top surface of the compartment mat is flush with a top surface of the extending portion.

10. The luggage compartment structure according to claim 9, wherein the mounting hole of the luggage compartment mat is formed in an area of the luggage compartment mat closer to a rear edge of the luggage compartment mat, and the recessed handle is disposed closer to the rear edge of the luggage compartment mat with the recessed portion in the mounting hole.

11. The luggage compartment structure according to claim 1, wherein the luggage compartment floor component further includes a tool holding recess spaced from the handle retaining recess such that a tool is removable from the tool holding recess.

\* \* \* \* \*